(12) United States Patent
Pande et al.

(10) Patent No.: US 11,011,155 B2
(45) Date of Patent: May 18, 2021

(54) MULTI-PHRASE DIFFERENCE CONFIDENCE SCORING

(71) Applicant: TEXAS INSTRUMENTS INCORPORATED, Dallas, TX (US)

(72) Inventors: Tarkesh Pande, Richardson, TX (US); Lorin Paul Netsch, Allen, TX (US); David Patrick Magee, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 12 days.

(21) Appl. No.: 16/051,607

(22) Filed: Aug. 1, 2018

(65) Prior Publication Data

US 2019/0043478 A1    Feb. 7, 2019

Related U.S. Application Data

(60) Provisional application No. 62/539,626, filed on Aug. 1, 2017, provisional application No. 62/612,310, filed on Dec. 29, 2017.

(51) Int. Cl.
| | |
|---|---|
| *G06F 17/00* | (2019.01) |
| *G10L 15/02* | (2006.01) |
| *G10L 15/14* | (2006.01) |
| *G06F 16/31* | (2019.01) |
| *G10L 15/08* | (2006.01) |

(52) U.S. Cl.
CPC ............ *G10L 15/02* (2013.01); *G06F 16/313* (2019.01); *G10L 15/142* (2013.01); *G10L 2015/088* (2013.01)

(58) Field of Classification Search
CPC . G10L 15/02; G10L 15/142; G10L 2015/088; G06F 16/313
USPC ............................................. 715/231; 700/94
See application file for complete search history.

(56) References Cited

U.S. PATENT DOCUMENTS

| | | | | |
|---|---|---|---|---|
| 5,675,706 A | * | 10/1997 | Lee | G10L 15/04 704/254 |
| 6,535,850 B1 | * | 3/2003 | Bayya | G10L 15/07 704/239 |
| 6,571,210 B2 | * | 5/2003 | Hon | G10L 15/08 704/243 |
| 7,966,183 B1 | * | 6/2011 | Yao | G10L 15/10 704/231 |
| 8,033,831 B2 | * | 10/2011 | Julia | G09B 7/02 434/185 |

(Continued)

*Primary Examiner* — Paul C McCord
(74) *Attorney, Agent, or Firm* — Michael A. Davis, Jr.; Charles A. Brill; Frank D. Cimino (57) ABSTRACT

An example method includes: receiving a test phrase; comparing feature vectors of the test phrase to contents of a first database to generate a first score; comparing the feature vectors of the test phrase to contents of a second database to generate a second score; comparing feature vectors of the contents of the second database to the contents of the first database to generate a third score; comparing the feature vectors of the contents of the second database to a model of the test phrase to generate a fourth score; determining a first difference score based on a difference between the first and second scores; determining a second difference score based on a difference between the third and fourth scores; and generating a difference confidence score based on a lesser of the first and second difference scores.

13 Claims, 6 Drawing Sheets

(56) References Cited

U.S. PATENT DOCUMENTS

| | | | | |
|---|---|---|---|---|
| 8,688,451 | B2* | 4/2014 | Grost | G10L 15/32 |
| | | | | 379/88.01 |
| 9,405,823 | B2* | 8/2016 | Mamou | G06F 16/3343 |
| 9,886,949 | B2* | 2/2018 | Li | G10L 15/16 |
| 2005/0149326 | A1* | 7/2005 | Hogengout | G10L 15/08 |
| | | | | 704/242 |
| 2010/0217596 | A1* | 8/2010 | Morris | G10L 15/10 |
| | | | | 704/251 |
| 2013/0275135 | A1* | 10/2013 | Morales | G10L 15/065 |
| | | | | 704/236 |
| 2014/0222415 | A1* | 8/2014 | Legat | G10L 13/08 |
| | | | | 704/8 |
| 2016/0005398 | A1* | 1/2016 | Kingsbury | G10L 15/083 |
| | | | | 704/254 |
| 2016/0336004 | A1* | 11/2016 | Minnis | G10L 13/10 |
| 2017/0069311 | A1* | 3/2017 | Grost | G10L 15/063 |
| 2017/0092262 | A1* | 3/2017 | Pinhasi | G10L 15/02 |
| 2018/0268815 | A1 | 9/2018 | Pande et al. | |
| 2018/0330717 | A1* | 11/2018 | Jin | G10L 15/12 |

* cited by examiner

MULTI-PHRASE DIFFERENCE CONFIDENCE SCORING

CROSS-REFERENCE TO RELATED APPLICATIONS

This application claims priority to U.S. Provisional Patent Application No. 62/539,626 filed Aug. 1, 2017 and U.S. Provisional Patent Application No. 62/612,310 filed Dec. 29, 2017, which are hereby incorporated herein by reference in their entireties.

BACKGROUND

Technological innovations that enable humans to interact with electronic devices include a wide range of devices, such as wearables, appliances, and robots. One enabling technology is human-machine interaction via voice commands, and one form of human-machine voiced interaction is automatic speech recognition (ASR). An example of ASR is the ability of devices to recognize and respond to short voice commands. Those are known as "keyword spotting systems." The keyword spotting system aims to detect any given keyword in spoken utterances. With the growing popularity of voice control in electronic devices, high-performance, low-latency, and small-footprint keyword spotting applications with low computational cost are becoming increasingly relevant.

SUMMARY

An example method includes: receiving a test phrase; comparing feature vectors of the test phrase to contents of a first database to generate a first score; comparing the feature vectors of the test phrase to contents of a second database to generate a second score; comparing feature vectors of the contents of the second database to the contents of the first database to generate a third score; comparing the feature vectors of the contents of the second database to a model of the test phrase to generate a fourth score; determining a first difference score based on a difference between the first and second scores; determining a second difference score based on a difference between the third and fourth scores; and generating a difference confidence score based on a lesser of the first and second difference scores.

In another example, a system includes an input device to receive a test phrase. A front-end, coupled to the input device, extracts feature vectors of the test phrase. Storage includes first and second databases. The first database includes first models of first phrases, and the second database includes second models of second phrases. The first and second models have states. The system further includes a processing unit, coupled to the storage and to the front-end, to generate a difference confidence score indicating a degree of similarity between the test phrase and the second models in the second database. Generating the difference confidence score includes: comparing the feature vectors of the test phrase to the states of the first and second models; and comparing feature vectors of the second models to the states of the first models and to states of a model of the test phrase.

In yet another example, a system includes an input device to receive a test phrase. A front-end, coupled to the input device, extracts feature vectors of the test phrase. Storage includes first and second databases. The first database includes a first model of a first phrase, and the second database includes a second model of a second phrase. The first and second models have states. The system further includes a processing unit, coupled to the storage and to the front-end, to: compare the feature vectors of the test phrase to states of the first model to generate a first cumulative state score; compare the feature vectors of the test phrase to states of the second model to generate a second cumulative state score; compare the states of the first model to feature vectors of the second model to generate a third cumulative state score; compare states of a model of the test phrase to the feature vectors of the second model to generate a fourth cumulative state score; determine a first difference score based on a difference between the first and second cumulative state scores; determine a second difference score based on a difference between the third and fourth cumulative state scores; determine a difference confidence score based on a lesser of the first and second difference scores; and provide information to a user based on the difference confidence score.

DETAILED DESCRIPTION

Keyword spotting systems have relied on neural networks, including feed-forward deep neural networks (DNN), recurrent neural networks (RNN), convolutional neural networks (CNN), long/short-term memory cells (LSTM), and combinations thereof. Several keyword spotting systems implement offline processing of audio signals using large-vocabulary, continuous-speech recognition systems. Those systems search large databases of audio content, which results in latency and large power consumption.

Also, real-time ASR decoding is computationally demanding. The exact workload depends on the task. Most devices supporting speech recognition either have high computation power (such as a multicore x86 processor) or an Internet connection linking them to cloud servers. The computational requirements often increase as researchers identify improved modeling techniques. Specialized hardware can bring speech interfaces to devices that are smaller and cheaper than PCs or that lack Internet connections. However, a difference in convenience and energy costs exists between on-chip (small) and off-chip (large) memory. In this description, example embodiments include efficient keyword spotting systems that support modern algorithms and frameworks, thereby improving the accuracy of the decoder and memory bandwidth.

At least some examples are directed to a system that determines a degree of similarity between multiple phrases that are received by the system. This information is useful for the system (and/or a user thereof) to determine whether one or more phrases should be added to a system database of phrases (for training the system). For example, the system compares the phrase "lights on" with the phrase "lights off" and generates a comparison metric reflecting a degree of phonetic similarity between the two phrases. If the system indicates that the degree of phonetic similarity between the phrases is high, then the system and/or the user decides (e.g., using a threshold) to exclude one of the phrases from a system database or to change the phrase. Conversely, if the system indicates that the degree of phonetic similarity between the phrases is low, then the system and/or the user decides (e.g., using the threshold) to include both of the phrases in the database. In this manner, the database is trained with numerous phrases, which are sufficiently dissimilar to not exceed a threshold degree of similarity.

In example embodiments, the system implements various techniques to determine the degree of phonetic similarity between multiple phrases. For example, in at least some examples, the system includes two databases, which are: (a) a first database that includes a substantial number of phrases, similar in breadth to a dictionary; and (b) a second database that includes phrases with which the system has been trained for speech recognition. Those phrases are stored in the first and second databases in the form of "models," which are digital representations of the phrases suitable for storage in electronic systems. For example, the phrases may be modeled according to Hidden Markov modelling (HMM) techniques or Gaussian mixture modelling (GMM) techniques, convolution neural networks (CNNs), deep neural networks (DNNs), and lattice decoding.

In at least some examples, the first database does not contain phrases that are in the second database. When the system receives a test phrase—such as a phrase with which a user wants to train the system for voice recognition—the system determines the degree of similarity between the test phrase and phrases already in the first database. This degree of similarity is indicated in the form of a first score. The various ways in which such comparisons are performed, including the specific models and algorithms to perform such comparisons, are described in detail below. The system additionally determines the degree of similarity between the test phrase and at least one phrase (or, in at least some examples, all phrases) in the second database to determine the degree of similarity between those two phrases. This degree of similarity is indicated in the form of a second score. The system then determines a difference between the first and second scores.

In some examples, third and fourth comparisons are performed. Before performing those comparisons, the test phrase is swapped with the one or more phrases in the second database. Accordingly the test phrase is stored as part of the second database, and the one or more phrases of the second database is/are removed (e.g., extracted) from the second database. The third comparison is then performed, in which the one or more phrases that was/were previously in the second database is/are sequentially compared against the one or more phrases in the first database. The fourth comparison includes comparing the one or more phrases that was/were previously in the second database to the test phrase, which (as described herein) is now stored in the second database. The degrees of similarity generated by those latter comparisons are indicated in third and fourth scores, respectively, and the system determines a difference between the third and fourth scores. The system subsequently determines a difference confidence score, which is the lesser of the two differences. In at least some examples, this difference confidence score is presented to the user, so that the user may instruct the system about whether to add the test phrase to the second database. In at least some examples, the system automatically (i.e., without user feedback) compares the difference confidence score to a threshold score (e.g., a threshold score programmed by a user or a system designer) to determine whether the test phrase is sufficiently dissimilar from the phrases in the second database to justify addition of the test phrase to the second database.

Figure 1:
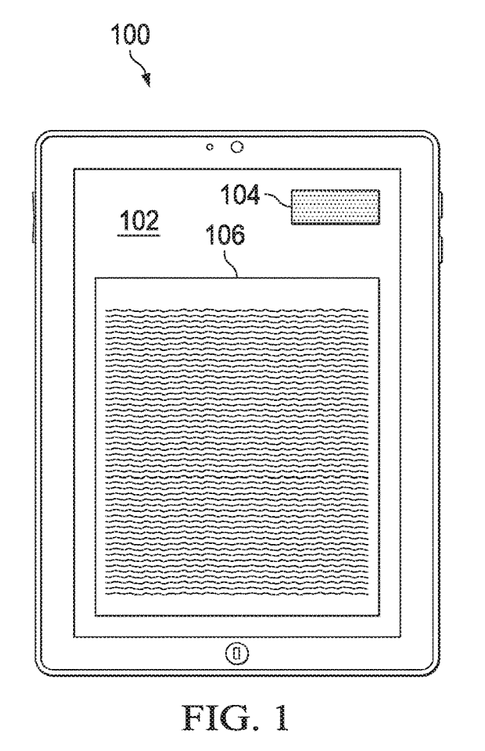
FIG. 1 depicts an illustrative graphical user interface of a keyword spotting system, in accordance with various examples.

FIG. 1 depicts an electronic device 100 containing a keyword spotting system that generates an illustrative graphical user interface (GUI) 102. For example, the electronic device 100 includes a tablet, a mobile phone, a laptop computer, a smart watch, an augmented reality device, or another suitable type of mobile device. A user of the electronic device 100 views various types of information on the GUI 102, such as information about the electronic device 100, photo galleries, news, e-mails, and the like. In operation, when the user of the electronic device 100 wants to enroll a test phrase in a database of the electronic device 100, the user taps an icon 104 of the GUI 102 to start a training phase for enrolling test phrases in the database. Tapping the icon 104 causes the electronic device 100 to perform certain actions. For example, the electronic device 100 begins receiving a speech signal comprising a test phrase from the user, compares the test phrase with already-enrolled and stored keyword phrases, determines a difference confidence score based on the comparison, and provides (to the user) detailed feedback, including a recommendation displayed in the window 106 of the GUI 102 of the electronic device 100.

Figure 2A:
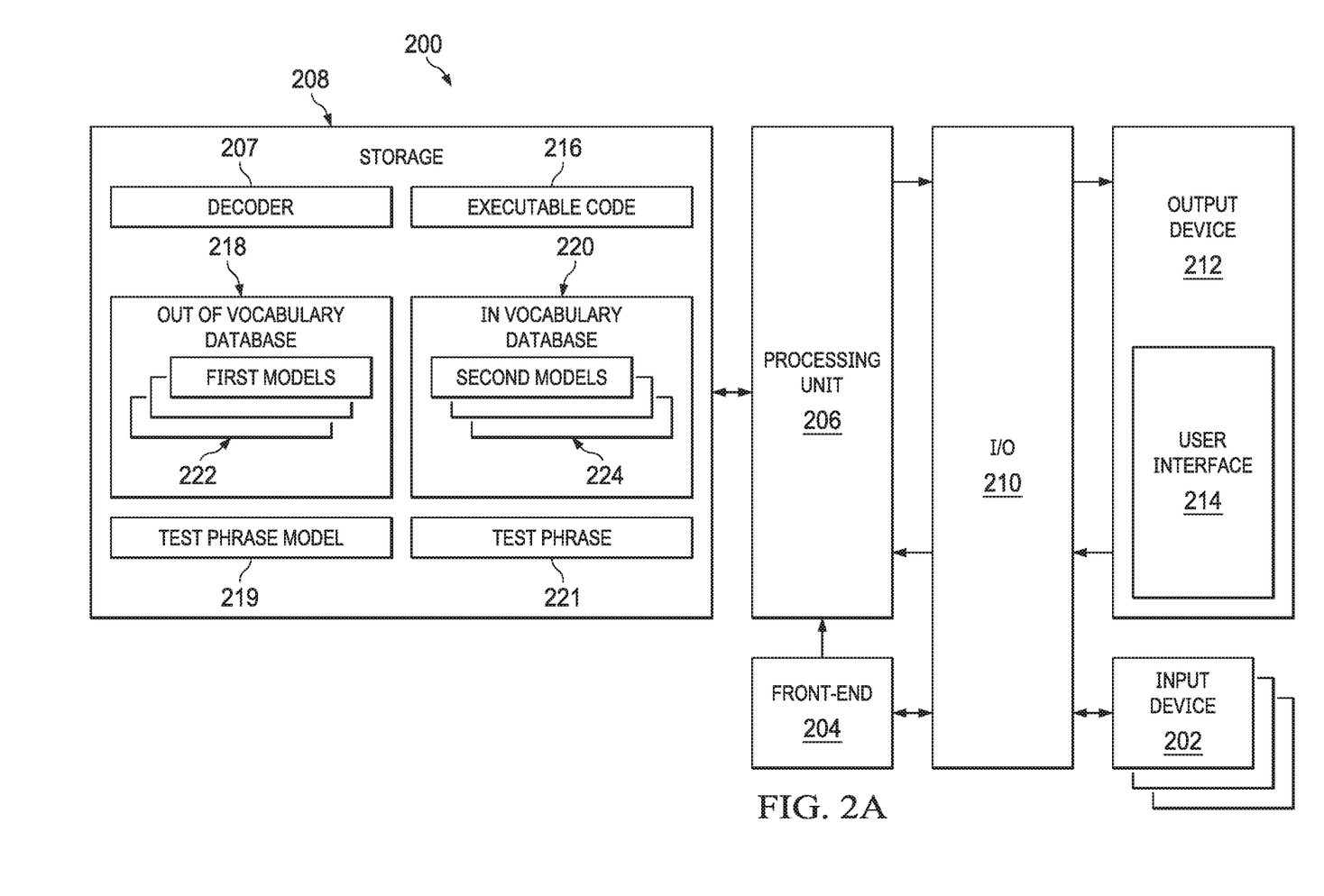
FIGS. 2A and 2B are block diagrams of an illustrative keyword spotting system, in accordance with various examples.

FIG. 2A is a block diagram of an illustrative keyword spotting system 200 in the electronic device 100 of FIG. 1. The keyword spotting system 200 includes one or more input devices 202, a front-end 204, a processing unit 206 (such as a microprocessor device), storage 208, an input/output module (I/O) 210, and an output device 212 suitable to provide a user interface 214, such as the GUI 102 in FIG. 1. The input devices 202 include a microphone to receive a speech signal or a network interface that receives a different type of speech signal, such as an audio file. The front-end 204 transforms the speech signal (e.g., 16-bit samples at 8 kHz or 16 kHz) into a lower-rate, higher-dimensional set of feature vectors, so it identifies the components of the speech signal that can be useful in identifying the test phrase and may discard other components of the signal that carry extraneous information, such as background noise. The details of the front-end 204 and its operation are described below in conjunction with FIG. 3.

The storage 208 comprises: a non-transitory, machine-readable storage medium (e.g., random access memory (RAM), read only memory (ROM)) that stores executable code 216; a decoder 207; an out-of-vocabulary (OOV) database 218 (also referred to herein as a "first database"); and an in-vocabulary (IV) database 220 ("also referred to herein as a "second database"). The executable code 216, when executed by the processing unit 206, causes the processing unit 206 to perform at least some of the functions attributed herein to the keyword spotting system 200. The decoder 207 comprises executable code according to one or more algorithmic techniques, such as Hidden Markov models (HMMs), Gaussian mixture models (GMMs), convolutional neural networks (CNNs), deep neural networks (DNNs), and lattice decoding. The IV database 220 comprises the phrases with which the keyword spotting system 200 has been trained for voice recognition purposes. The IV database 220 stores those phrases in the form of second models 224, the number of which depends on the number of phrases enrolled in the IV database 220. In some examples, the second models 224 represent individual keywords within phrases. In contrast, the OOV database 218 comprises phrases representing a general vocabulary, which are phrases (e.g., words, phrases, babbling noises, and other non-sensical utterances) that are not in the IV database 220, but which are candidates for storage in the OOV database 218. Those phrases are stored in the OOV database 218 in the form of first models 222. In some examples, the first models 222 represent individual keywords within phrases. In at least some examples, the IV database 220 is populated with phrases enrolled during training phases. In at least some examples, the OOV database 218 is populated with phrases and sounds enrolled offline, such as during manufacture and not during a training phase.

The I/O 210 facilitates communication between the processing unit 206 and the output device 212. The I/O 210 also facilitates communication between the front-end 204 and the one or more input devices 202. The I/O 210 comprises any operation, algorithm, and/or device that transfers data between the processing unit 206 and the output device 212 and/or between the front-end 204 and the one or more input devices 202.

In operation, during a training phase, the input device 202 receives a speech signal comprising a test phrase from the user of the electronic device 100 of FIG. 1. In some examples, the front-end 204 extracts one or more feature vectors of the test phrase from the speech signal. The processing unit 206 obtains the feature vectors of the test phrase from the front-end 204 and, by executing the decoder 207, uses the feature vectors of the test phrase to generate a model of the test phrase. That model is stored as test phrase model 219 in storage 208. In some examples, the test phrase model 219 represents the entire test phrase. In other examples, the model 219 represents only part (e.g., a keyword) of the test phrase. The test phrase itself is stored in storage 208 as test phrase 221.

During a subsequent recognition phase, the processing unit 206 performs several comparisons, as described herein. During the first comparison, the processing unit 206 compares the test phrase 221 to a first model 222 in the OOV database 218. The first model 222 is formed by a plurality of states, with each state represented by an acoustic distribution that is derived from the feature vectors of that model. To perform the first comparison, the processing unit 206 compares each feature vector of the test phrase 221 to each state of the first model 222. Each such comparison results in a score for each state of the first model 222. As each state of the first model 222 is compared to a different feature vector of the test phrase 221, the score for that state accumulates. After the final feature vector of the test phrase 221 is compared to each state of the first model 222, each state of the first model 222 has a final state score associated with it. The final state scores of the first model 222 are combined to generate a cumulative state score for the first model 222. This process is performed for any number of first models 222 in the OOV database 218. In some examples, the cumulative state scores for the individual first models 222 are combined to form a cumulative state score for the OOV database 218.

Also, the processing unit 206 performs a second comparison, which is similar to the first comparison. But during the second comparison, the processing unit 206 performs its comparisons against the second models 224 in the IV database 220 (instead of performing its comparisons against the first models 222 in the OOV database 218). Such comparisons result in cumulative state scores for the various second models 224, which may be combined to form a cumulative state score for the IV database 220.

The processing unit 206 then determines a difference between: (a) the cumulative state score for the OOV database 218; and (b) the cumulative state score for the IV database 220. This difference is the "first difference score."

Figure 2B:
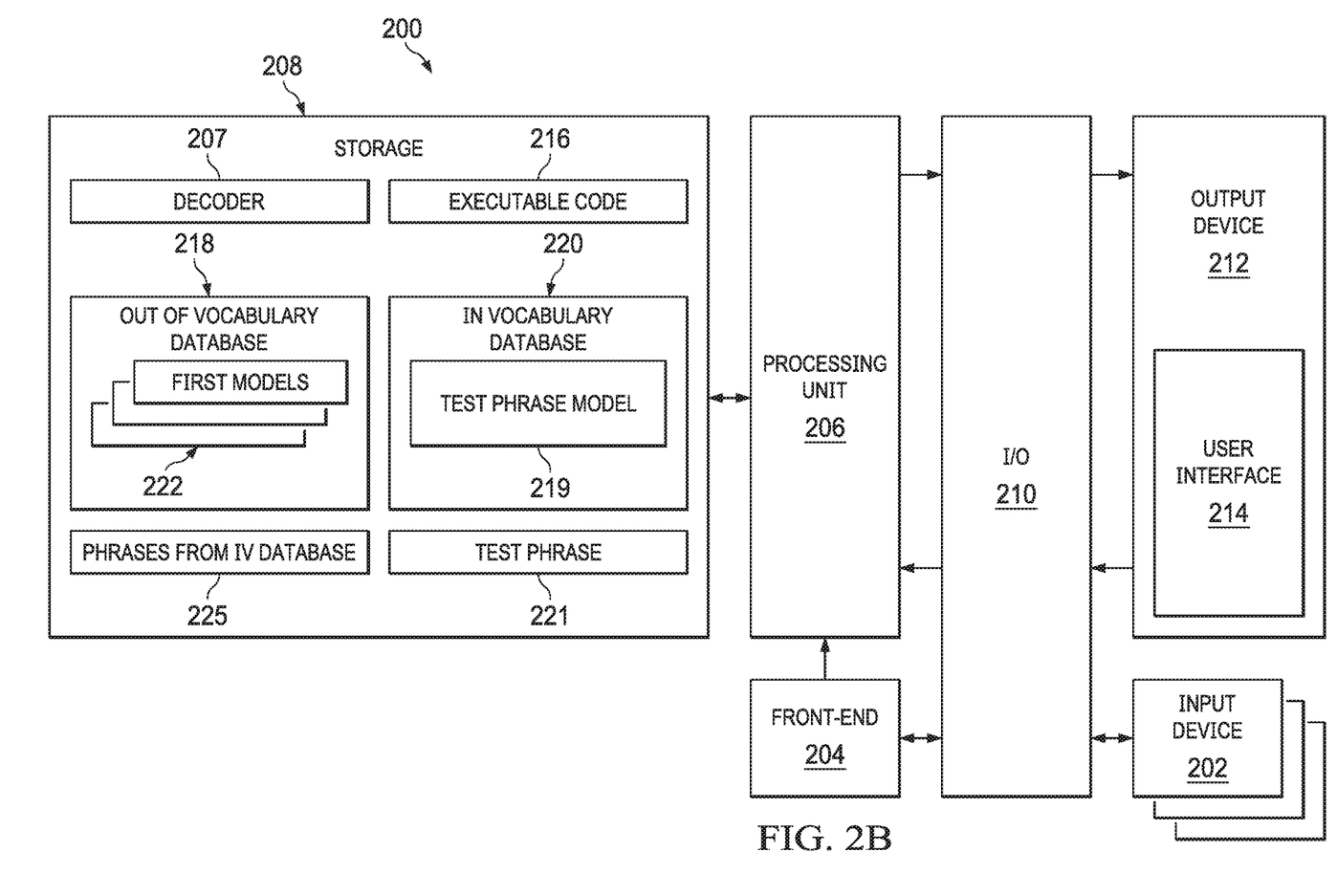

Before performing the third and fourth comparisons, the processing unit 206 "swaps" the second models 224 in the IV database 220 with the test phrase model 219. Accordingly, as shown in FIG. 2B, the "post-swap" IV database 220 contains the test phrase model 219, and the one or more phrases from the IV database 220 (whose models were previously stored as second models 224) is/are extracted from the IV database 220 and stored outside the IV database 220 in the storage 208 as the phrases from IV database 225.

During a third comparison, the processing unit 206 sequentially compares the feature vectors of the one or more phrases from the IV database 225 with the states of the first models 222 in the OOV database 218. The state scores are added to determine a third cumulative state score.

During a fourth comparison, the processing unit 206 compares the feature vectors of the phrases from the IV database 225 with the states of the test phrase model 219 in the IV database 220. This comparison generates state scores which, when summed, generate a fourth cumulative state score. The processing unit 206 then determines a difference between the third and fourth cumulative state scores to generate a "second difference score."

The processing unit 206 then determines which of the first and the second difference scores is lower. The minimum of the first and the second difference scores is a "difference confidence score," which indicates the degree of similarity between the test phrase and the second models 224 of the IV database 220.

In at least some examples, the processing unit 206 is configured to compare the difference confidence score against a threshold (e.g., a pre-programmed threshold, or a dynamically variable threshold), in order to provide a recommendation that is displayed to the user via the output device 212 (e.g., on the user interface 214), so the user may (responsive to that recommendation) decide whether the processing unit 206 should add or reject the test phrase 221 as a valid keyword phrase of the keyword spotting system 200. The user's decision is provided to the processing unit 206 via the I/O 210. If the user's decision indicates that the test phrase 221 should be accepted as a valid keyword phrase, then the processing unit 206 permanently adds the test phrase 221 to the IV database 220 of the storage 208. Conversely, if the user's decision indicates that the test phrase 221 should not be accepted as a valid keyword phrase, then the processing unit 206 refrains from adding the test phrase 221 to the IV database 220.

In at least some other examples, the processing unit 206 performs some or all of the above-described actions independently of user feedback. For example, in such other examples, the processing unit 206 automatically compares the difference confidence score to the threshold and unilaterally adds (or refrains from adding) the test phrase to the IV database 220, independent of any user feedback.

Figure 3:
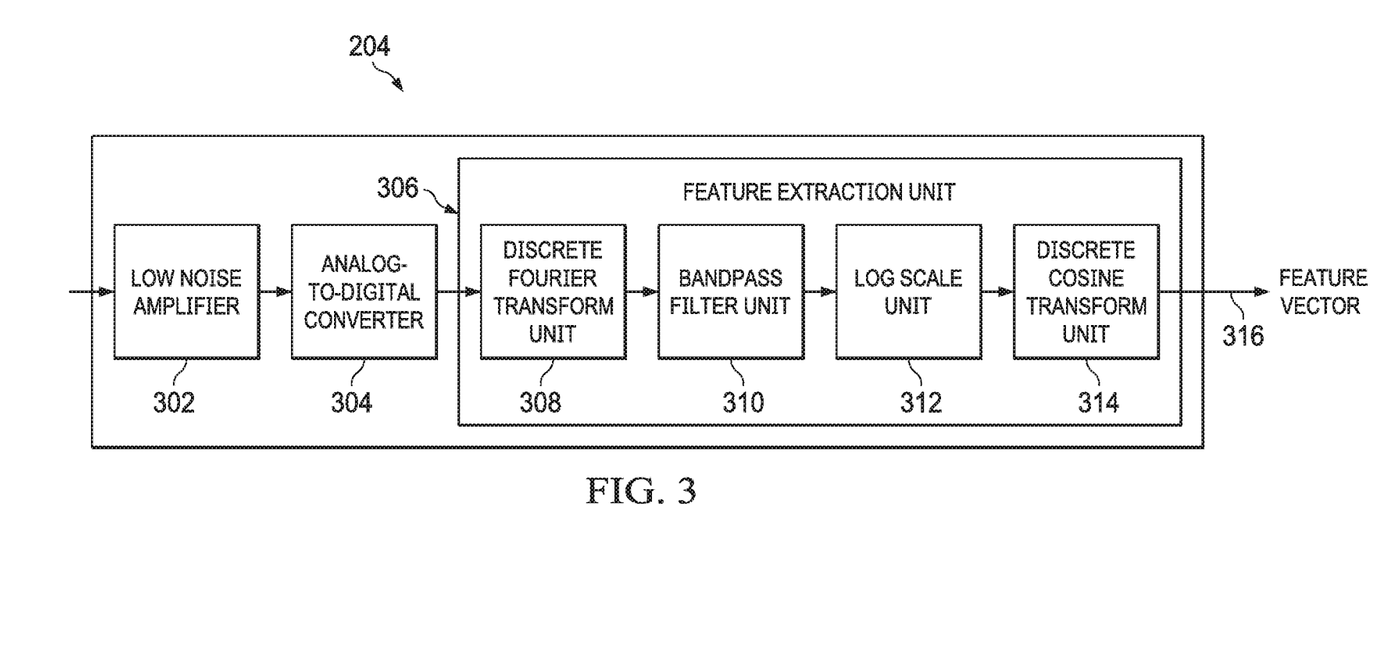
FIG. 3 is a block diagram of an illustrative front-end in the system of FIGS. 2A and 2B, in accordance with various examples.

FIG. 3 is a block diagram of an illustrative front-end 204 in the keyword spotting system 200 of FIGS. 2A and 2B. The front-end 204 comprises a low noise amplifier (LNA) 302, an analog-to-digital converter (ADC) 304 and a feature extraction unit 306. The feature extraction unit 306 further comprises a discrete Fourier transform (DFT) unit 308, a bandpass filter (BPF) unit 310, a log scale unit 312, and a discrete cosine transform (DCT) unit 314. The feature extraction unit 306 of the front-end 204 transforms a speech signal into a set of feature vectors, in which speech-specific properties are emphasized and statistical redundancies are suppressed. Each feature vector represents individual frames of the speech signal, and they are used by the processing unit 206 (and the decoder 207) to perform some or all of the actions described above. Examples of such representations include Mel-Frequency Cepstral coefficients (MFCC), perpetual linear prediction coefficients (PLP), and linear predictive coding coefficients (LPC). In at least some examples, the keyword spotting system 200 uses LPC representation for feature vectors 316, which are computed using the signal processing pipeline of the front-end 204 shown in FIG. 3. The feature vectors 316 can be augmented with log-energy, time derivatives (e.g., deltas or double-deltas), and/or temporal context (features from previous frames) to improve performance. For example, a typical utterance (e.g., sentence) has a duration of 1-20 seconds, or 100-1000 frames, but the frame rate can vary for some other examples. Those feature vectors are provided to the decoder 207 of the keyword spotting system 200.

In operation, the low noise amplifier 302 interfaces with the input device 202 via the I/O 210 of FIGS. 2A and 2B. A speech signal is received from the input device 202 and is passed through the low noise amplifier 302, in order to amplify possibly weak speech signals (such as those received by the microphone). This step is performed because high frequency components of the speech signal have small amplitudes with respect to low frequency components. Next, the speech signal with high energy is passed through the analog-to-digital converter 304 to obtain a digital representation of the speech signal. The digital form of the speech signal is then passed though the DFT unit 308 to convert each frame of the speech signal from the time domain into the frequency domain and to compute the power spectrum.

In at least some examples, the digital form of the speech signal in frequency domain is passed through the bandpass filter unit 310 and the log scale unit 312. This design adds redundancy in the extracted features of the speech signal, making the feature extraction unit 306 tolerant to shifts in the center frequency of the bandpass filter unit 310. The logarithm of the square magnitude of each of the outputs of the bandpass filter unit 310 is computed in the log scale unit 312. The log scale unit 312 compresses the dynamic range of values and makes frequency estimates less sensitive to slight variation in the speech signal. This design accommodates the fact that the human ear does not respond linearly to the amplitude of speech signals. Finally, the output of the log scale unit 312 is converted into the time domain using discrete cosine transform unit 314, which results in feature vectors 316 that are received by decoder 207 of the keyword spotting system 200.

Figure 4A:
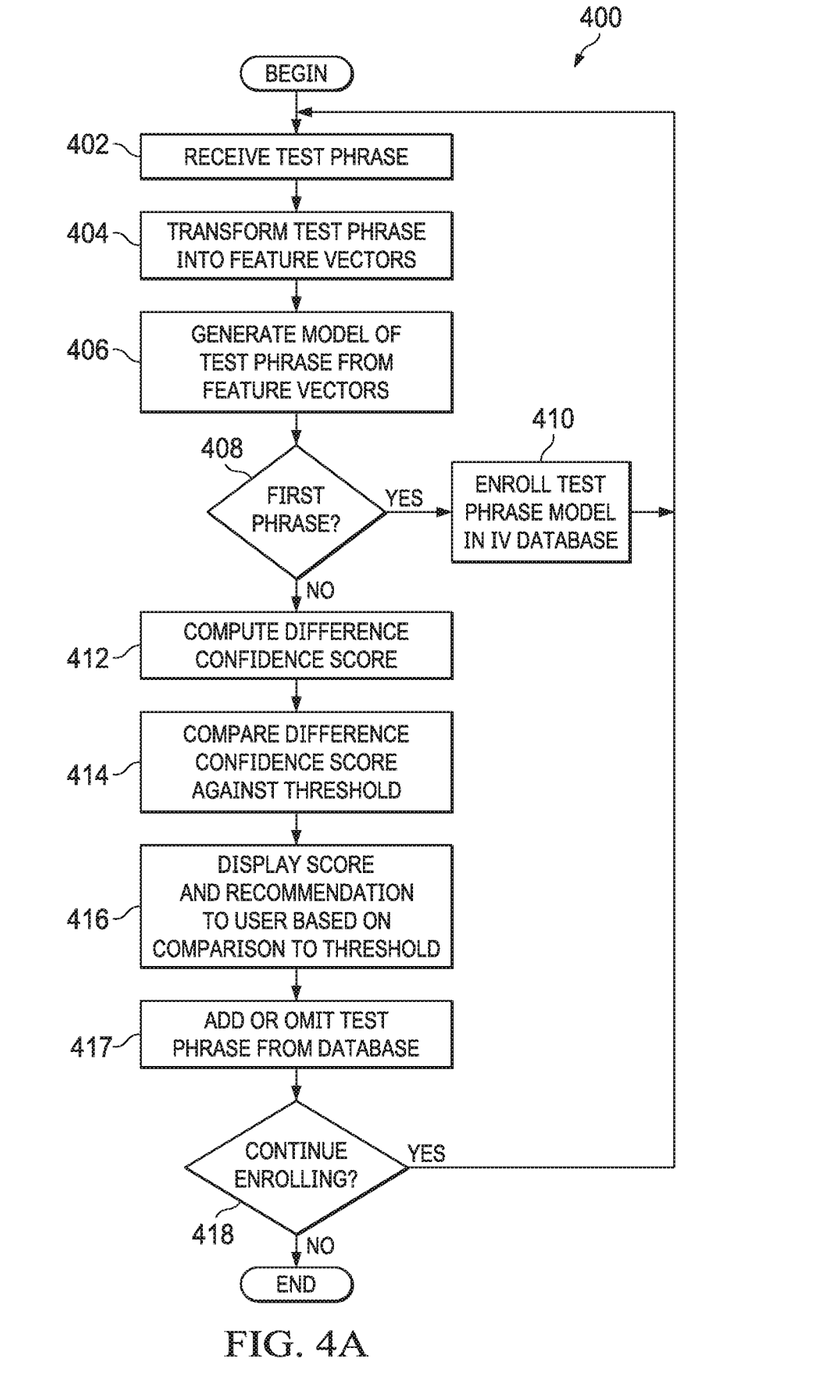
FIG. 4A is a flow diagram of an illustrative method of enrolling a test phrase to an in-vocabulary database of the system of FIGS. 2A and 2B, in accordance with various examples.

FIG. 4A is a flow diagram of an illustrative method 400 for enrolling the test phrase to the IV database 220 of the keyword spotting system 200. The method 400 is described in the context of FIGS. 2A and 2B, and it is performed by the keyword spotting system 200 of the electronic device 100 of FIG. 1. In some examples, before beginning the method 400, the electronic device 100 of FIG. 1 performs one or more other functions (e.g., running various applications). Other types of content are displayed, such as e-mails, pictures, or a blank screen.

In at least some examples, the performance of the method 400 is triggered when the user of electronic device 100 requests the keyword spotting system 200 to add a new keyword phrase in the IV database 220—such as by tapping an icon 104 (FIG. 1). For example, the method 400 begins when the input device 202 receives a test phrase in the form of a speech signal from the user (step 402). The method 400 is not limited to receiving speech signals from the input device 202. The test phrase is received from an audio digital file, such as via the Internet or another network. As described herein, in at least some examples, the front-end 204 transforms the speech signal into a set of feature vectors (step 404). Further, a model (e.g., HMM) of the test phrase is generated from the feature vectors in the processing unit 206 (step 406), with both the test phrase and its model being stored in storage 208 as depicted in FIG. 2A. Next, the method 400 compares the feature vectors of the test phrase to contents of the IV database 220 (step 408). In this example, the test phrase is the first phrase to be trained in the keyword spotting system 200, so the model of the test phrase is enrolled as a keyword model in the IV database 220 (step 410). However, if other test phrases are to be trained in the keyword spotting system 200, then the next test phrase is compared against both the first and second models 222, 224 by the processing unit 206.

In at least some examples, C1, C2, C3, . . . , CN denote the test phrases to be enrolled in the keyword spotting system 200. In the first iteration, test phrase C1 is enrolled and stored as a second model 224 in the IV database 220 (step 410). In the next iteration, the feature vectors of test phrase C2 are extracted by the front-end 204, and those feature vectors are compared to the states of the first and second models 222, 224 as described above to generate a first difference score. The test phrase model is then "swapped"—as described above—with the second model 224, and a second difference score is generated based on comparing the feature vectors of the phrases from the IV database to the states of the first models and to the states of the test phrase model. The differences scores are compared and the minimum of the two is identified as the difference confidence score (step 412).

In at least some examples, the difference confidence score indicates the similarity between the test phrase and the second model 224, according to:

$$diffscore(C1, C2) = \min(diffscore([C1], C2), diffscore([C2], C1))$$

$$diffscore([C1], C2) = K\left(\frac{H1score - H0score}{length(C2)}\right) + B;$$

$$diffscore([C2], C1) = K\left(\frac{H1score - H0score}{length(C1)}\right) + B$$

where ([C1], C2) implies C1 is the second model 224, and C2 is the test phrase. H1score is a cumulative state score for the second models 224 in the IV database 220, and this score indicates the degree of similarity between the test phrase and the second models 224 in the IV database 220. Similarly, H0score is a cumulative state score for the first models 222 in the OOV database 218, and this score indicates the degree of similarity between the test phrase and the first models 222 in the OOV database 218. Length (C1) and Length (C2) refer to the number of feature vectors in C1 and C2, respectively; K is a gain; and B is a bias. In some examples, both K and B are determined by the manufacturer of the system. Diffscore([C1], C2) and diffscore([C2],C1) are the difference scores described above. Diffscore(C1, C2) is the difference confidence score and is the minimum of the difference scores, as described above.

In at least some examples, the difference confidence score is compared against a threshold (step 414) to determine whether to add or reject the test phrase C2 as a valid second model 224 of the keyword spotting system 200 (step 412). In at least some examples, this determination is displayed to the user in the form of a recommendation via a graphical user interface, such as the user interface 214 (FIG. 1). In at least some examples, the difference confidence score is displayed to the user, and the user is permitted to indicate whether the keyword phrase should be added to the keyword spotting system 200 (step 416). For example, if the difference confidence score is between 0.8-1.0, then the recommendation of "add phrase" is displayed to the user via the output device 212. Similarly, if the difference confidence score is between 0.4-0.79, then the recommendation of "similar phrases" is displayed to the user via the output device 212. However, if the difference confidence score is between 0.0-0.39, then the recommendation of "use different phrase" is displayed to the user via the output device 212. In at least some examples, both the difference confidence score and the recommendation are displayed to the user. If the test phrase C2 is accepted as a valid second model 224, then it is added to the IV database 220 of the storage 208 (step 417); otherwise, it is omitted (step 417). The method 400 next provides the user with the options of either continuing enrollment or aborting (step 418)—such as by tapping an icon 104 (FIG. 1). In at least some examples, if the user continues the training, then the input device 202 receives a new test phrase C3 in the form of a speech signal from the user (step 402), and the comparison of the new test phrase C3 is performed against both C2 and C1. This comparison is performed during the enrollment phase of C3, and the difference confidence score is computed as:

$$\text{diffscore}(C1,C2,C3) = \min(\text{diffscore}([C1,C2],C3), \text{diffscore}([C3],C1), \text{diffscore}([C3],C2))$$

where ([C1,C2],C3) implies that both C1 and C2 comprise the second models 224, and C3 is the test phrase.

The number of new difference score computations scales linearly with the size of the set of keyword phrases. For each new test phrase, the difference confidence score is the minimum across the individual difference scores:

$$\text{diffscore}(C1, C2, \ldots, CN) = \min \begin{Bmatrix} \text{diffscore}([C1, C2, \ldots, CN-1], CN) \\ \text{diffscore}([CN], CN-1) \\ \vdots \\ \text{diffscore}([CN], C1) \end{Bmatrix}$$

where ([C1,C2, . . . , CN−1], CN) implies that C1, C2, . . . , CN−1 comprise the second models 224, and CN is the test phrase. If the IV database 220 includes N second models 224, then the total number of difference score computations is:

$$\sum_{k=2}^{N} k = \frac{N(N+1)}{2} - 1$$

Figure 4B:
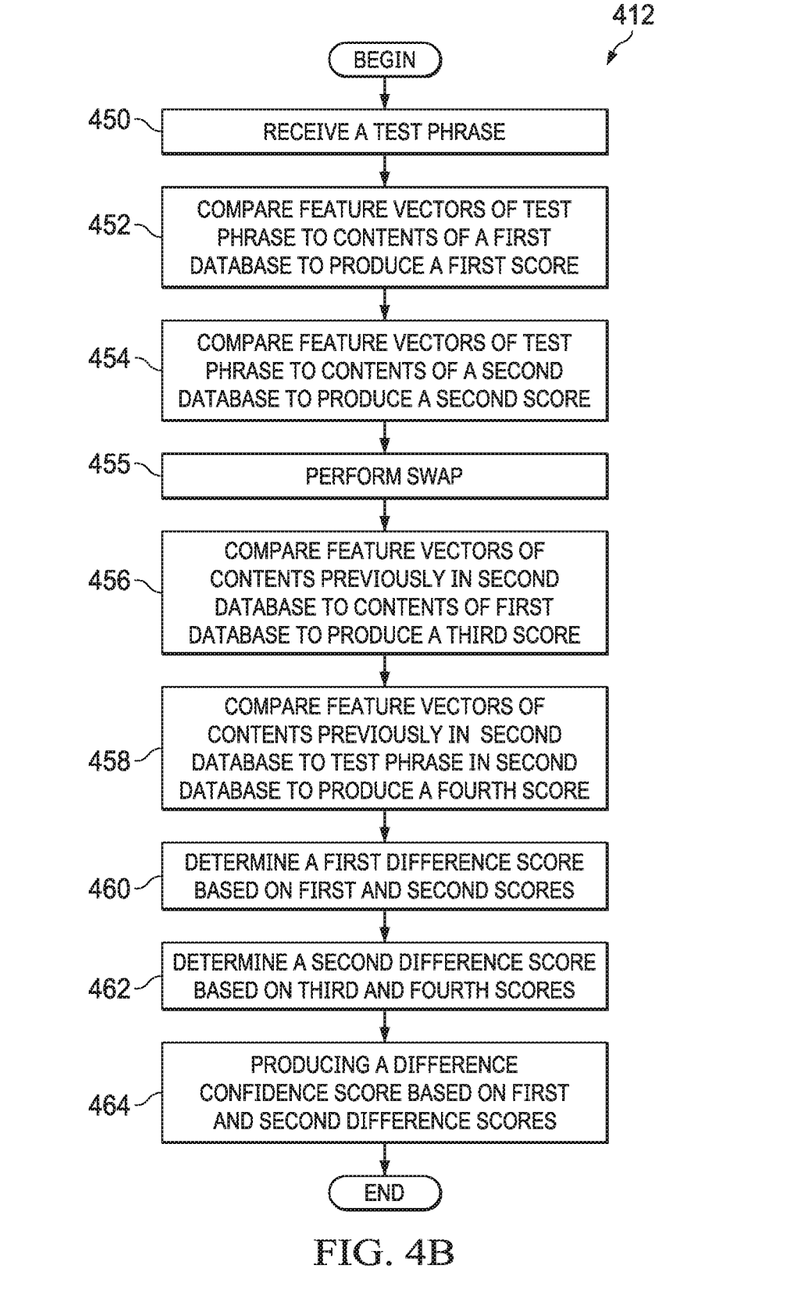
FIG. 4B is a flow diagram of an illustrative method of determining a difference confidence score, in accordance with various examples.

FIG. 4B is a flow diagram of an illustrative method 412 for determining a difference confidence score, in accordance with various examples. The method 412 is labeled as "412" because it corresponds to step 412 of FIG. 4A. The method 412 begins with receiving a test phrase (step 450). Next, the method 412 compares feature vectors of the test phrase to contents of a first database (e.g., the OOV database 218) to generate a first score (step 452). More particularly, the feature vectors of the test phrase 221 are compared to states of first models 222 in the OOV database 218, as described in detail above, to generate a first cumulative state score. The method 412 then compares feature vectors of the test phrase to contents of a second database to generate a second score (step 454). For example, feature vectors of the test phrase 221 are compared to states of second models 224 in the IV database 220 to generate the second cumulative state score. The "swap" described above between the test phrase and the contents of the second database is performed (step 455). The method 412 then compares feature vectors of contents previously in the second database to the contents of the first database to generate a third cumulative state score (step 456). For example, this includes comparing the feature vectors of the phrases from the IV database 225 to the states of the first models 222. Next, the method 412 compares the feature vectors of contents previously in the second database to the states of the test phrase model to generate a fourth cumulative state score (step 458). For example, this step includes comparing the feature vectors of the phrases from the IV database 225 to the states of the test phrase model 219 to generate the fourth cumulative state score. Difference confidence scores are then calculated using the first, second, third, and fourth cumulative state scores (steps 460 and 462), and a difference confidence score is determined by identifying the lesser of the difference confidence scores (step 464).

Figure 5:
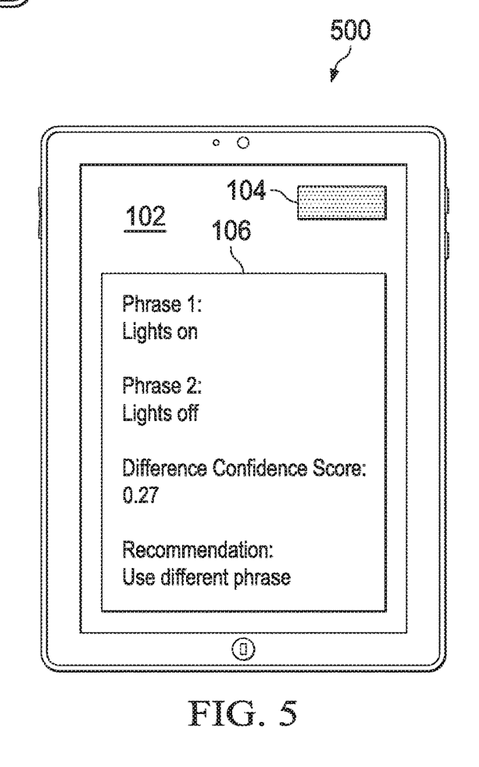
FIG. 5 depicts an illustrative feedback graphical user interface of an illustrative keyword spotting system, in accordance with various examples.

FIG. 5 depicts an illustrative feedback graphical user interface (GUI) 102 of the keyword spotting system of an electronic device 500, for displaying information to a user. In some examples, the electronic device 500 is a device (e.g., a tablet) for enrolling a test phrase using the keyword spotting system of the electronic device 500. In operation, after the training and testing of the test phrase against a keyword phrase using the built-in keyword spotting system in the electronic device 500, a detailed feedback with a difference confidence score and a recommendation are displayed to the user on the window 106 of the GUI 102 of the electronic device 500. A lower difference confidence score against a threshold indicates that the test phrase and the keyword phrase are similar. A higher difference confidence score against a threshold indicates that the test phrase and the keyword phrase are dissimilar.

In at least some examples, responsive to the displayed information in the window 106 of the GUI 102 of the electronic device 500, the user instructs the system to: (a) add the test phrase to the keyword spotting system of the electronic device 500; or (b) enroll another test phrase specified by the user, such as by the user enunciating the same test phrase (e.g., with greater clarity) or a different test phrase; or (c) end the enrollment in the keyword spotting system of the electronic device 500, such as by the user tapping the icon 104 of the electronic device 500.

In this description, the term "couple" or "couples" means either an indirect or direct connection. Thus, if a first device couples to a second device, that connection is through a direct connection or through an indirect connection via other devices and connections.

Modifications are possible in the described embodiments, and other embodiments are possible, within the scope of the claims.

What is claimed is:

1. A method comprising:
receiving a speech signal indicative of a test phrase, the test phrase having first feature vectors;
generating a model of the test phrase responsive to the first feature vectors;
comparing the first feature vectors to first voice phrases of a first database to generate a first score indicative of phonetic similarity between the test phrase and the first voice phrases;
comparing the first feature vectors to second voice phrases of a second database to generate a second score indicative of phonetic similarity between the test phrase and the second voice phrases, the second voice phrases having second feature vectors;
comparing the second feature vectors to the first voice phrases to generate a third score indicative of phonetic similarity between the second voice phrases and the first voice phrases;
comparing the second feature vectors to the model of the test phrase to generate a fourth score indicative of phonetic similarity between the second voice phrases and the test phrase;
determining a first difference score based on a difference between the first and second scores;
determining a second difference score based on a difference between the third and fourth scores; and
generating a difference confidence score based on a lesser of the first and second difference scores, the difference confidence score indicative of phonetic similarity between the test phrase and the first and second voice phrases.

2. The method of claim 1, further comprising comparing the difference confidence score to a threshold value, and determining whether to add the test phrase to the second database based on the comparison.

3. The method of claim 1, further comprising adding the test phrase to the second database in response to a request from a user.

4. The method of claim 1, wherein the first database is an out-of-vocabulary (OOV) database, and the second database is an in-vocabulary (IV) database.

5. The method of claim 1, wherein the first voice phrases and the second voice phrases include models of voice phrases, and the models are formed according to an algorithmic technique selected from the group consisting of: Hidden Markov models (HMMs), Gaussian mixtures models (GMMs), convolution neural networks (CNNs), deep neural networks (DNNs), recursive neural networks (RNNs), and lattice decoding.

6. The method of claim 1, wherein comparing the first feature vectors to the first voice phrases to generate the first score includes comparing the first feature vectors to states of a model in the first database.

7. The method of claim 6, further comprising generating a state score by combining multiple scores generated from comparing the first feature vectors to the states of the model in the first database.

8. The method of claim 7, further comprising: generating state scores for multiple models in the first database; combining the state scores to generate a cumulative state score; and based on the cumulative state score, determining whether to add the test phrase to the second database.

9. A system comprising:
a front-end device having a front-end input and a front-end output, the front-end device configured to: receive a speech signal at the front-end input, the speech signal indicative of a test phrase; extract first feature vectors of the test phrase; and provide the first feature vectors at the front-end output;
storage configured to store first and second databases, the first database including a first model of a first voice phrase, the second database including a second model of a second voice phrase, the first and second models having states, and the second model having second feature vectors; and
a processing unit, coupled to the storage and to the front-end device, the processing unit configured to:
generate a model of the test phrase responsive to the first feature vectors;
compare the first feature vectors to states of the first model to generate a first cumulative state score;
compare the first feature vectors to states of the second model to generate a second cumulative state score;
compare the states of the first model to the second feature vectors to generate a third cumulative state score;
compare the model of the test phrase to the second feature vectors to generate a fourth cumulative state score;
determine a first difference score based on a difference between the first and second cumulative state scores;
determine a second difference score based on a difference between the third and fourth cumulative state scores;
determine a difference confidence score based on a lesser of the first and second difference scores, the difference confidence score indicative of phonetic similarity between the test phrase and the first and second models; and
provide information to a user based on the difference confidence score.

10. The system of claim 9, wherein the processing unit is configured to provide a recommendation to the user based on the difference confidence score and a threshold.

11. The system of claim 9, wherein the first and second models are based on a Hidden Markov modeling (HMM) technique.

12. The system of claim 9, wherein the first database is an out-of-vocabulary (OOV) database, and the second database is an in-vocabulary (IV) database.

13. The system of claim 9, wherein the information includes the difference confidence score, the processing unit is configured to receive a request from the user responsive to the information, and the request is for the processing unit to add the test phrase to the second database.

* * * * *